G. G. FELLAND.
VOTING MACHINE.
APPLICATION FILED NOV. 18, 1909.
993,671.
Patented May 30, 1911.
8 SHEETS—SHEET 1.
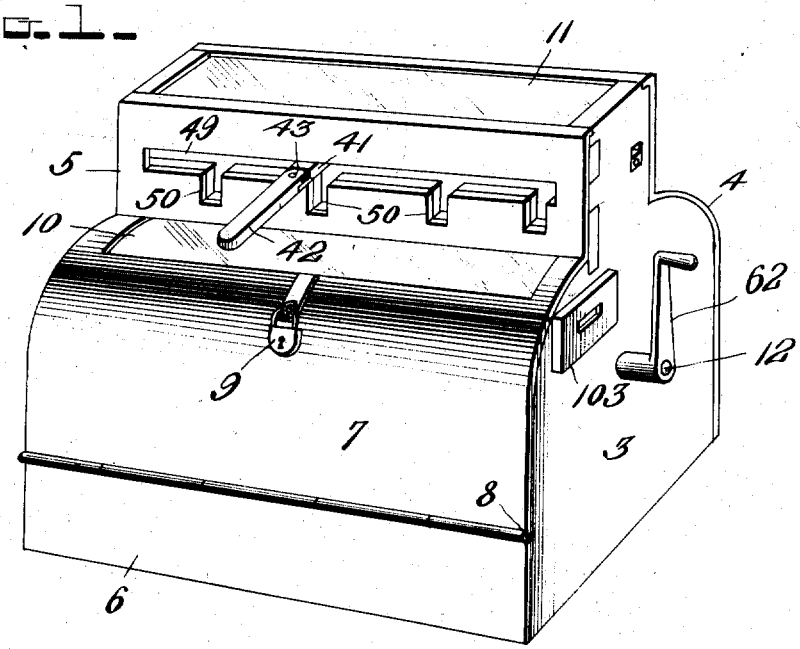
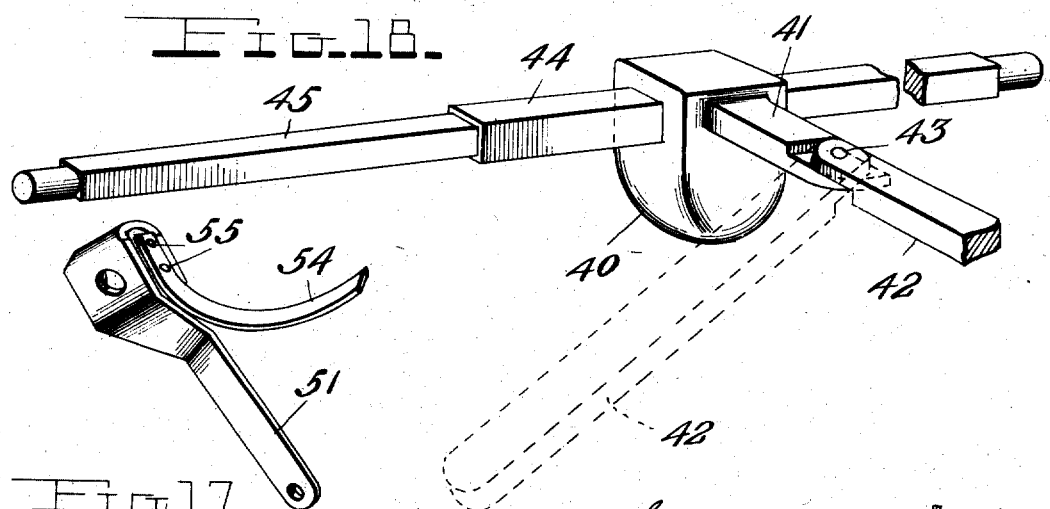
Witnesses
Chas. L. Griesbauer.
E. M. Ricketts
Inventor
Gunder G. Felland
By Watson E. Coleman
Attorney

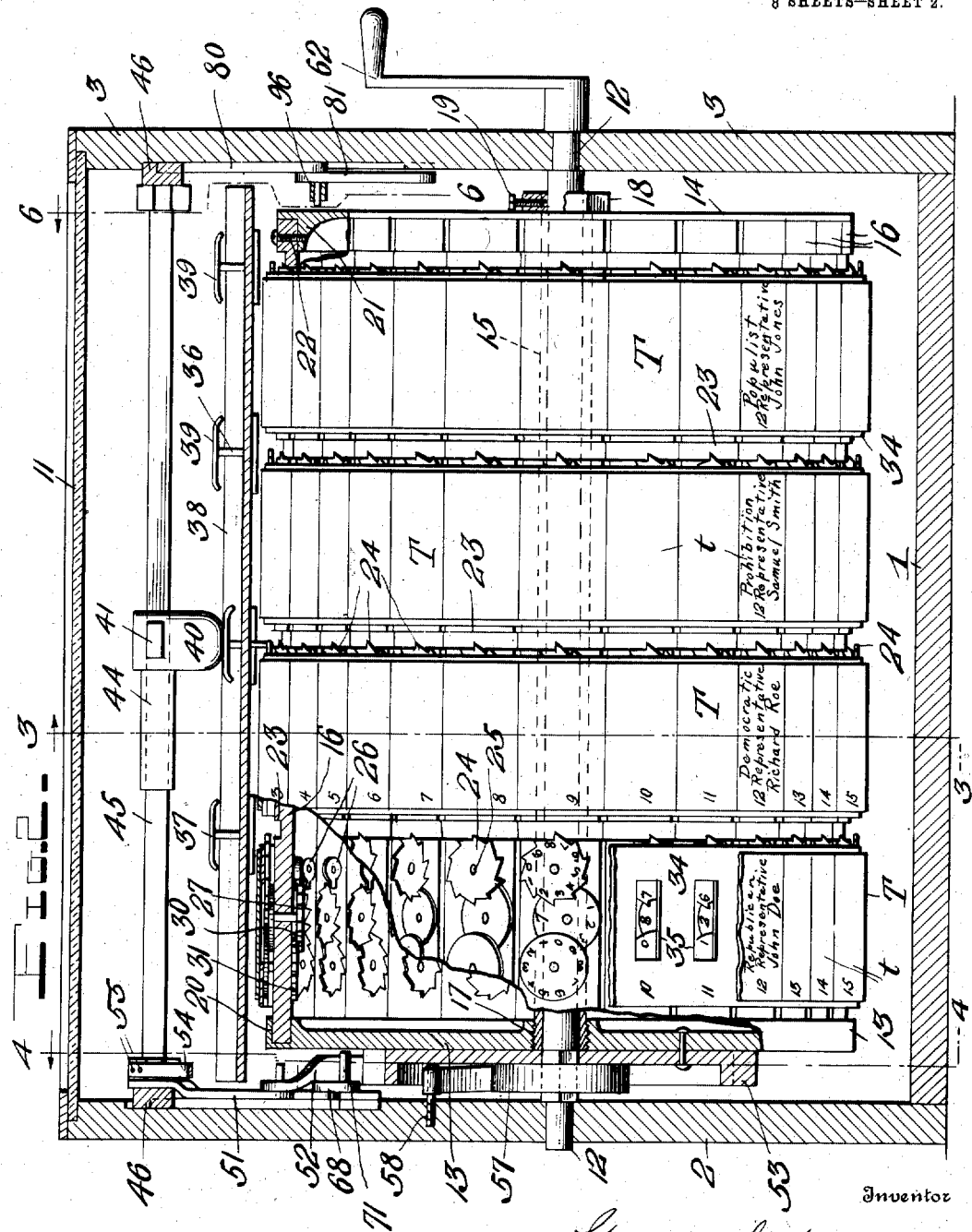

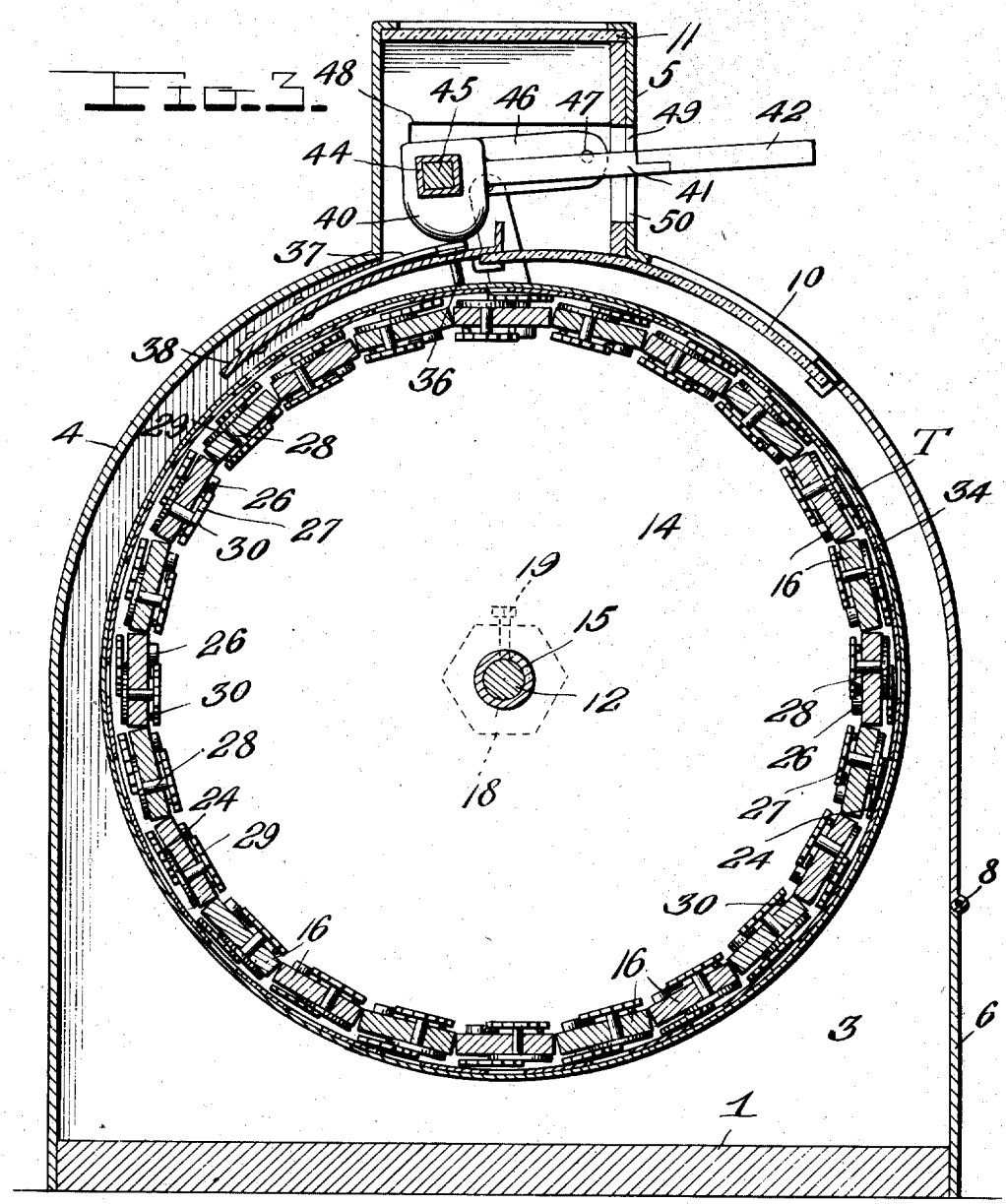

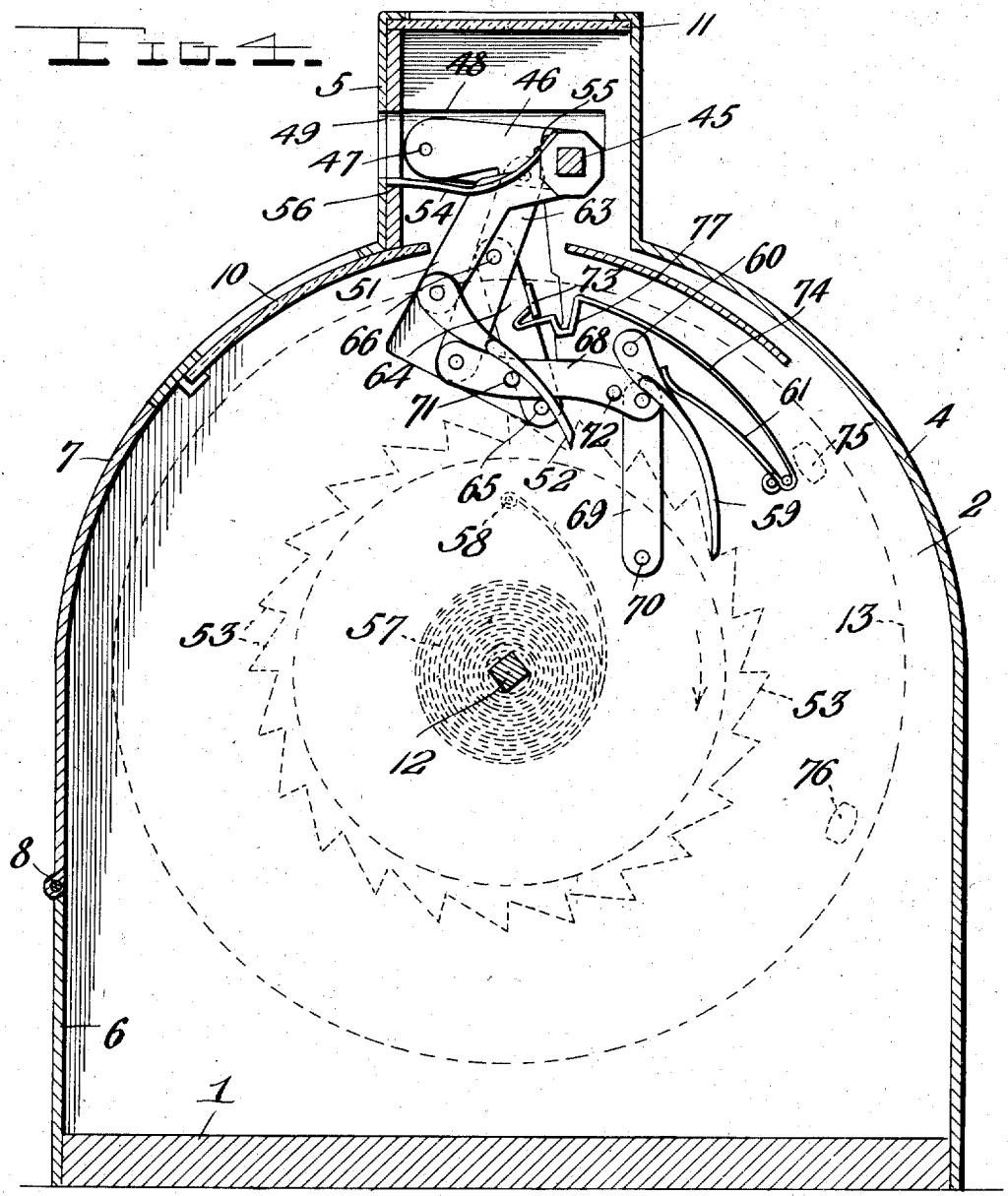

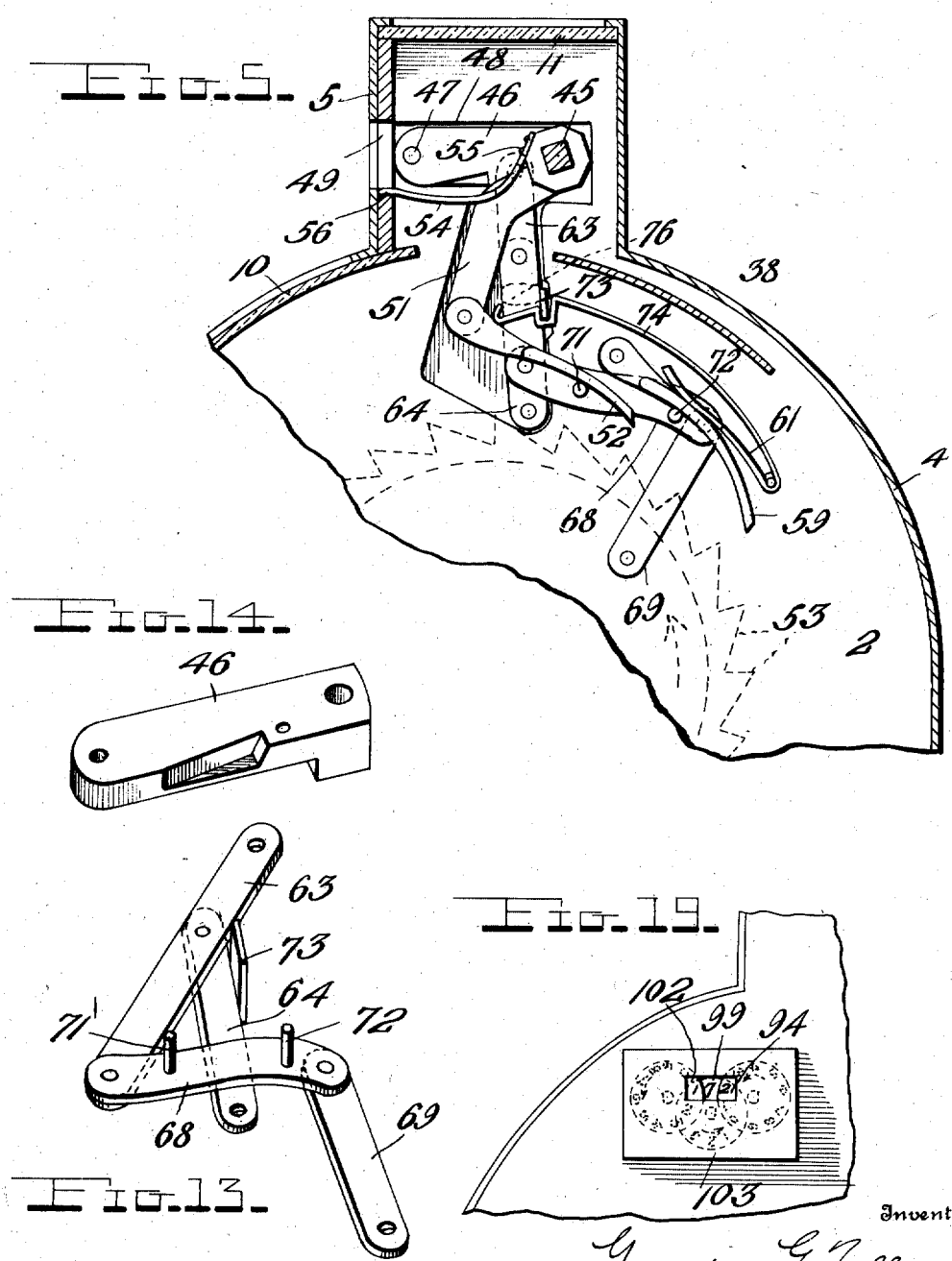

G. G. FELLAND.
VOTING MACHINE.
APPLICATION FILED NOV. 18, 1909.
993,671.
Patented May 30, 1911.
8 SHEETS—SHEET 6.
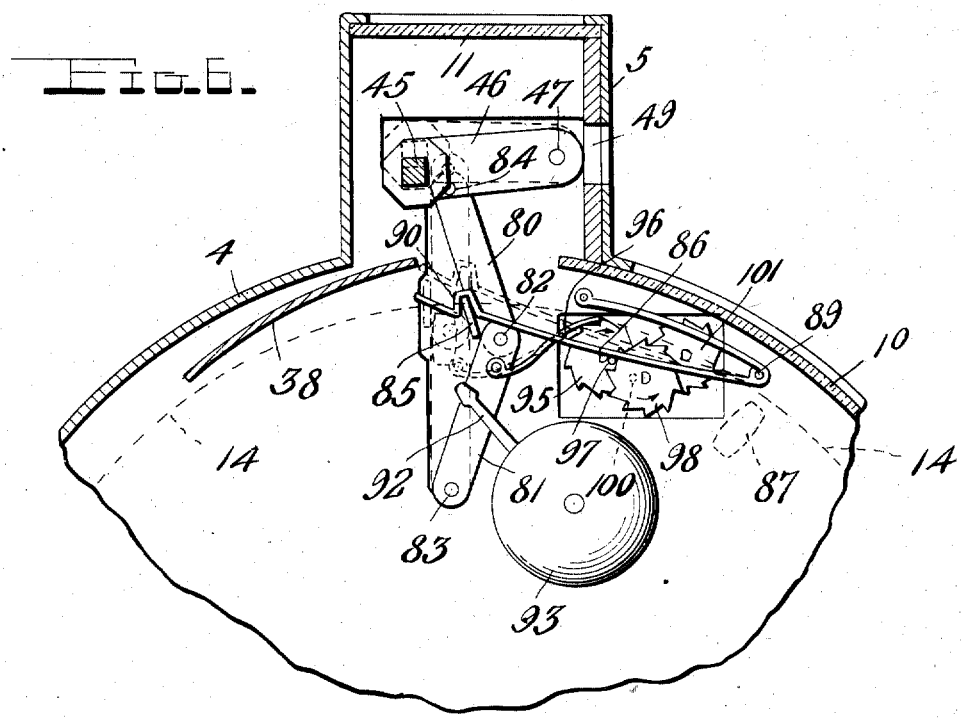
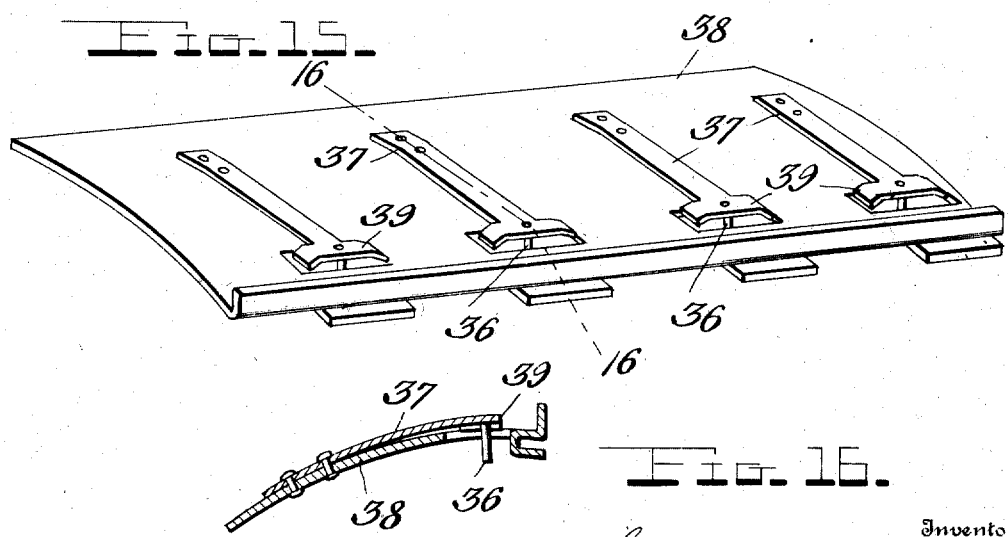

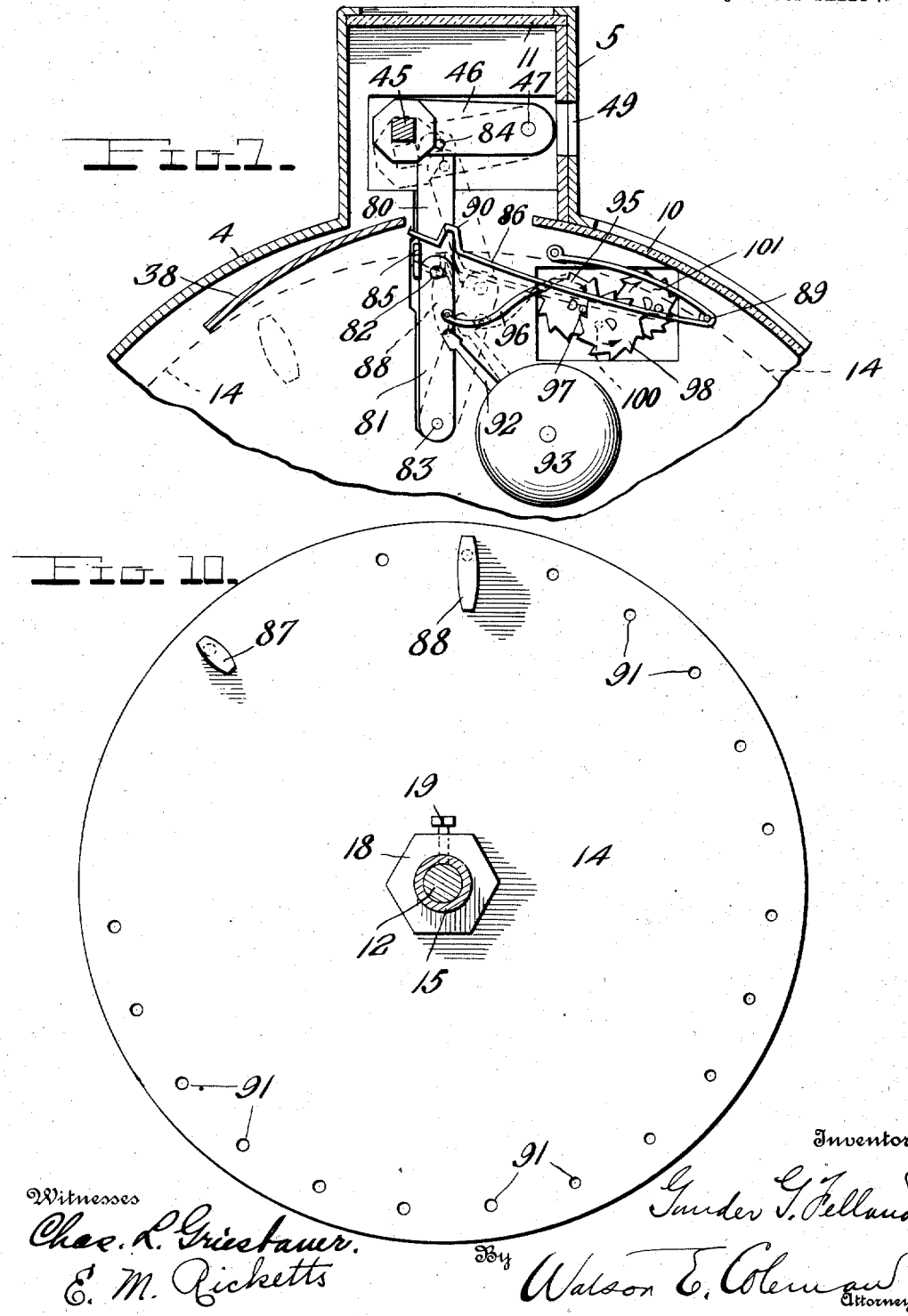

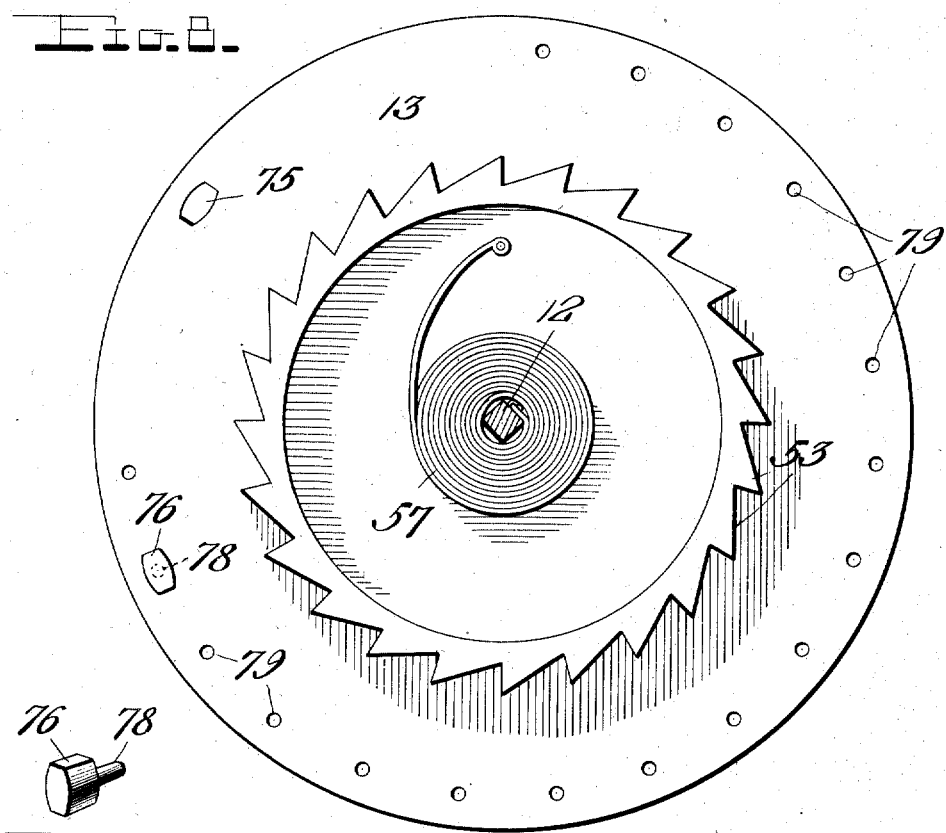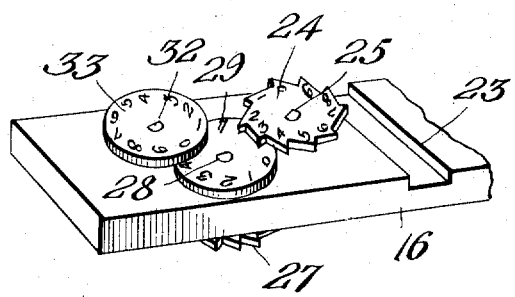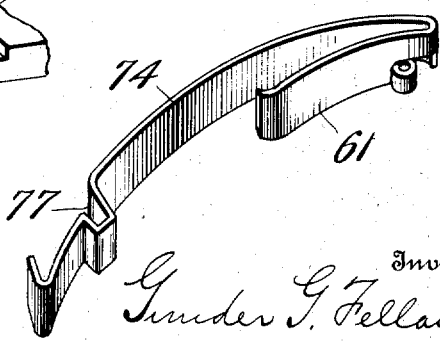

UNITED STATES PATENT OFFICE.

GUNDER G. FELLAND, OF WILBUR, WASHINGTON.

VOTING-MACHINE.

993,671.        Specification of Letters Patent.     Patented May 30, 1911.

Application filed November 18, 1909. Serial No. 528,808.

*To all whom it may concern:*

Be it known that I, GUNDER G. FELLAND, a citizen of the United States, residing at Wilbur, in the county of Lincoln and State of Washington, have invented certain new and useful Improvements in Voting-Machines, of which the following is a specification, reference being had to the accompanying drawings.

My invention relates to improvements in voting machines; and its objects are to provide a machine of this character which will be simple in construction and consequently strong, durable and inexpensive, to provide a machine of this character which will be accurate and reliable so that there can be no fraud or cheating on the part of the voters, and to provide a machine of this character which while especially adapted to voting either straight or split tickets of political elections may also be used for voting upon various questions.

With the above and other objects in view, the invention consists of the novel construction, combination and arrangement of parts hereinafter fully described and claimed, and illustrated in the accompanying drawings in which—

Figure 1 is a perspective view of my improved voting machine. Fig. 2 is a vertical longitudinal section showing parts of the cylinder or drum broken away and in section. Figs. 3 and 4 are vertical transverse sections taken respectively on the planes indicated by the lines 3—3 and 4—4 in Fig. 2; Fig. 5 is a detail view similar to the upper part of Fig. 4 but showing the mechanism in retracted position; Fig. 6 is a detail vertical section taken on the plane indicated by the line 6—6 in Fig. 2; Fig. 7 is a view similar to Fig. 6 but showing parts in different position; Fig. 8 is an end view of the left hand end of the drum; Fig. 9 is a perspective view of one of the adjustable trip lugs; Fig. 10 is an end view of the right hand end of the drum; Fig. 11 is a perspective view of one of the spring latches; Fig. 12 is a perspective view of one end of one of the bars or slats of the drum showing one of the registers; Fig. 13 is a perspective view of a pair of toggle levers and co-acting levers at one end of the casing; Fig. 14 is a perspective view of one of the bearing arms or levers for the rock shaft; Fig. 15 is a perspective view of a supporting plate and the series of spring dogs which it carries; Fig. 16 is a detail section taken on the plane indicated by the line 16—16 in Fig. 15; Fig. 17 is a perspective view of the pawl carrying arm on the rock shaft. Fig. 18 is a similar view of the rock shaft and the operating lever thereon, and Fig. 19 is a detail view showing the register which indicates the total number of votes cast.

The body or casing of my improved machine may be of any desired form and construction but as illustrated it consists of a rectangular base 1 from which rise end members 2. 3 having rounded top portions with centrally disposed upwardly projecting extensions as clearly shown in Fig. 1. A suitably shaped back plate 4 closes the rear portion of the casing, while its front is closed by upper and lower plates 5, 6 and a removable door 7, which latter is hinged as at 8 and provided with a suitable lock 9. In the front may be arranged a glass 10 or other transparent sheet or plate to permit the interior parts to be viewed, and at the extreme top of the casing is a glass 11 from which may be viewed the several tickets hereinafter referred to.

Arranged within the lower main portion of the casing is a horizontally disposed cylindrical drum fixed to a longitudinal shaft 12 mounted for rotation in suitable bearings in the ends 2, 3. Said drum consists of two circular heads 13, 14, a central tube or sleeve 15, and an annular series of slats or bars 16. The sleeve or tube 15 which receives the shaft 12 has one of its ends screwed into the head or disk 13 as shown at 17 in Fig. 2, and upon its opposite end which projects through the other head or disk 14 is arranged a retaining nut 18, the latter being held in position by a transverse screw 19 which passes through the sleeve 15 and impinges against the shaft to lock the drum thereto. The head 13 is formed on its inner face and at its outer edge with a surrounding groove 20 to receive the ends of the slats 16. The other head 14 has formed upon its inner face an inwardly extending annular flange 21 which forms a supporting shoulder for the opposite ends of the slats 16, and to which latter said slats are detachably secured by screws or similar fastenings 22, see Fig. 2. The slats or bars 16 are arranged close together so that they form the cylindrical surface or periphery of the drum, and formed in the outer faces of said slats at proper intervals are transverse grooves 23 which divide the drum into several annular sections. One of these sections is provided for each party and in the drawings four of the sections are shown, but it will be understood that a greater or less number may be provided. The formation of the grooves 23 divides said slats into sections, each of which carries a registering device for recording the number of votes cast for a particular candidate. Owing to this construction and arrangement it will be seen on reference to Fig. 2 that the drum contains several annular series of registering devices, one series being provided for each party, and one register for each candidate in each party.

While in the present embodiment of the invention the drum is provided with only twenty-four slats and consequently twenty-four candidates can be voted for, it will be understood that the number of registering devices in each annular series may be increased or decreased according to the use which the machine is designed to serve. Each of said registers consists of a units-wheel 24 fixed to a transverse shaft 25 rotatable in one of the slats 16. The periphery or edge of the wheel 24 is formed with ten ratchet teeth and the pivot of said wheel is so arranged that one of the teeth will project over the adjacent groove 23 in said slat. Fixed to the inner end of the pivot or shaft 25 is a radially projecting finger 26 adapted to engage one of ten teeth of a ratchet wheel 27 fixed to the inner end of a pivot 28, the outer end of which latter carries a tens-wheel 29. The ratchet wheel 27 carries a pin 30, see Fig. 2, which is adapted to engage one of the ten teeth of a ratchet wheel 31 fixed to the inner end of a pivot 32 on the outer end of which latter is secured the hundreds wheel 33. A register thus constructed is adapted to record 999 votes but it will be understood that the register may be made with a greater or less number of wheels according to the capacity desired.

34 denotes one of several register covering members and is in the form of an annular band or strip suitably secured over one of the annular series of registers and formed with openings 35 through each of which are exposed three of the numerals on the wheels of the register beneath such opening. The strip or band 34 is also adapted to support the ticket T which is preferably in the form of a strip of paper suitably printed with the names of the different candidates in separate sections or coupons. These several sections or coupons of the ticket are consecutively numbered as at "$t$" and the openings 35 in the strip or band 30 are correspondingly numbered, as shown in Fig. 2. One number, of course, stands for each of the registers and by numbering the latter, and also the candidates, the total number of votes cast for a candidate may be readily ascertained by removing the ticket from the band 34 and then referring to the register which corresponds in number to the number of the particular candidate whose vote is desired.

The registers are actuated by rotating the drum to bring the teeth of the units-wheels 24 into engagement with relatively stationary dogs 36 in the form of pins carried by springs 37 which are fixed to a longitudinally extending and transversely curved supporting plate 38 suitably mounted on the upper portion of the casing. The springs 37 have T-shaped free ends 39 which work through slots in the plate 38 and which carry the pins or dogs 36 so that when said ends or heads 39 are depressed the pins 36 will project into the grooves 23 of the slats 16 and will be disposed in the path of the teeth of the units-wheels 24. The extremities or arms of the T-shaped heads 39 are downwardly curved or cam-shaped so that said springs may be readily depressed by the rounded or cam-shaped head 40 of an operating lever 41. This lever which is preferably provided with a swinging outer section 42 pivoted at 43 to a fixed inner section, has its head 40 provided with a sleeve 44 shaped to slide upon a squared or flat faced portion of a rock shaft 45. This shaft is arranged longitudinally in the extended top portion of the casing and has its ends rotatable in bearings in the free ends of two arms or levers 46 pivoted at 47 and arranged for limited swinging movement in recesses 48 formed in the inner faces of the ends 2, 3 of the casing of the machine. The lever 41 projects through a longitudinal slot 49 which is formed in the front wall or section 5 of the casing and which has in its bottom a series of vertical notches 50 into which said lever may be swung. The sleeve 44 on the inner end or head of the lever permits it to be moved longitudinally on the flat faced or polygonal rock shaft 45 and the recesses or vertical slots 50 are so disposed that the lever may be swung downwardly, while its cam portion 40 is disposed over one of the springs 37 to depress the latter and hold its pin or dog 36 in one of the grooves in the drum and consequently in the path of wheels of the registers on the corresponding section of the drum. Said lever is thus depressed for the purpose of shifting or partially rotating the drum and consequently moving one of the registers past the depressed dog 36 and thereby registering a vote, and to enable the drum to be thus operated an arm 51 is fixed to the left hand end of the rock shaft 45 and carries a pivoted dog or pawl 52 to engage the teeth of a ratchet wheel 53 suitably fixed to the head 13 of the drum. The number of teeth of the ratchet wheel 53 correspond to the number of slats 16 on the drum so that each time that the shaft 45 is rocked the pawl 52 will move the ratchet wheel the distance of one tooth and consequently the next candidate on the ticket will appear beneath the glass covered side opening in the top of the casing. To return the parts to normal position after the hand lever has been depressed, I preferably provide a leaf spring 54, one end of which is fixed at 55 to the arm 51, and the end of which is fixed in a slot 56 of the casing, as shown in Fig. 4. When the drum is thus actuated it is moved against the tension of a spiral spring 57, the inner end of which is fixed to the main shaft 12, and the outer end of which is attached to a pin 58 on the inner face of the end 2 of the casing. The drum is held against retrograde rotation by a dog or pawl 59 which engages the teeth on the ratchet wheel 53 and which is pivoted at 60 on the end 2 and is actuated by a spring 61. By repeatedly depressing the hand lever 41 the drum may be shifted intermittently or step by step until it has made a revolution, or in other words, until each candidate has been voted for. Of course where a straight ticket is voted the lever is depressed in the same notch or slot 50, but where the ticket is split said lever is shifted back and forth on the rock shaft and depressed over the desired portion of the drum. To expedite the voting of a straight ticket I provide on the right hand end of the shaft 12 a crank handle 62 which when given a turn will cause the drum to be quickly rotated so that all of the registers in one annular series will be actuated by the engagement of the units-wheels of such registers with the depressed pin or dog 36.

For the purpose of preventing a person from voting more than once, I provide means for notifying the officer in charge of the machine when the drum has made one complete, or substantially complete, rotation, and means for re-setting the drum for operation by the next voter. This last mentioned means consists of a pair of toggle levers 63, 64, the latter of which has its lower end pivoted at 65 to the end 2 of the casing, and its other end pivoted at 66 to the intermediate portion of the lever 63. The upper end of the lever 63 is pivoted at 67 to the adjacent arm or lever 46, and its projecting lower end has pivoted to it a link 68. The latter is pivotally connected to a supporting link 69 which is in turn pivoted at 70 to the end 2 of the casing. The link 68 is disposed substantially horizontal and carries two laterally projecting pins 71, 72 which are adapted to elevate the dogs 52, 59, respectively and hold them in retracted position, as presently explained. The lever 64 has provided upon it a laterally projecting lug 73 with which co-acts a spring latch 74 and two trip lugs 75, 76. The latch 74 which is fixed to the end 2 of the casing, is in the form of a spring and if desired may be formed integral with the spring 61, as shown more clearly in Fig. 11, and it has at its free end a depression or seat 77 adapted to receive the projection or lug 73 when the toggle levers 63, 64 are moved to their straightened position shown in Fig. 5. The trip lugs 75, 76 are carried by the end or head 13 of the drum and are so constructed and arranged that they will successively engage the lug 73 to actuate said toggle levers. The lug 75 is stationary on the end of the drum and is adapted to engage and depress the latch spring 74 to release the toggle levers before it engages the lug 73 to return said levers to their angular position, shown in Fig. 4. The lug 76 may be adjusted at different points around the drum for the purpose of limiting the rotary movement thereof and causing the latter to be re-set before it has made a complete rotation, this being desirable in cases where a less number of candidates are voted for than the capacity of the machine permits. The adjustment of said lug 76 may be effected by forming it with a reduced end or stem 78 for insertion in any one of an annular series of sockets 79 formed in the end or head 13, as shown more clearly in Fig. 8. When the machine is being set for the election, said adjustable lug 76 is inserted in the socket or seat 79 opposite the register of the last candidate so that the drum after being turned past such register will be automatically re-set by reason of the engagement of said lug with the lug 73 and the consequent straightening of the toggle levers 63, 64 to retract the pawls or dogs 52, 59 from engagement with the ratchet wheel 53 as hereinafter more fully explained. At the opposite end of the casing is arranged a pair of toggle levers 80, 81, as shown more clearly in Fig. 6 of the drawings. These levers are pivoted to each other at 82 and the lower lever is pivoted at 83 to the end 3 of the casing, while said upper lever is pivoted at 84 to the adjacent lever 46. The upper lever 80 has a laterally projecting lug 85 with which co-acts a spring latch 86 and two trip lugs 87, 88. The spring latch 86 is fixed at 89 to the end 3 and has a notch or seat 90 at its free end for the reception of the lug 85, whereby the toggle levers 80, 81 will be held in their angular position shown in Fig. 6 to lock the rock shaft 45 in its lowered position. The trip lugs 87, 88 are similar to the lugs 75, 76, and are carried by the end or head 14 of the drum. The lug 87 which is non-adjustable is adapted to engage the spring latch 86 and lift it out of engagement with the lug 85 before it strikes the latter to straighten the toggle levers 80, 81. The other lug 88 is adjustable by engaging it with any one of the seats or sockets 91 formed in the head 14, as shown more clearly in Fig. 10 of the drawings. Said lug 88 is adapted to engage the lug 85 when the toggle levers are in their straightened position and to return them to their normal angular position. The lug 88 is also adapted to engage and actuate a lever or other operating element 92 of a bell 93 arranged on the end 3 of the casing and adapted to notify the officer in charge of the machine when a voter has cast his ballot.

For the purpose of indicating the total number of votes that are cast at the election, I provide the register shown in Figs. 6 and 19 of the drawings. This register which is arranged in the end 3 of the casing has on the inner end of the pivot of its units-wheel 94 a ratchet wheel 95, the teeth of which are engaged and actuated by the dog or pawl 96 pivoted to the toggle lever 81. The ratchet wheel 95 carries a pin 97 which engages and actuates a ratchet wheel 98 on the pivot of a tens-wheel 99, and said ratchet wheel 98 carries a pin 100 which engages and actuates a ratchet wheel 101 on the pivot of a hundreds-wheel 102. The ratchet wheels 95, 98, 101, are disposed in a recess in the inner face of the end 3, while the wheels 94, 99, 102, are arranged within a casing 103 on the outer face of said end 3.

The operation of the machine is as follows: Assuming the tickets of the several parties have been applied to the drum, and the adjustable trip lugs 76 and 88 have been properly positioned in the heads of said drum, when a voter enters the booth he grasps the hand lever 41 and moves it longitudinally in the slot 49 until he brings it opposite the vertical slot or notch 50 of the party for whom he desires to cast his vote. If he desires to vote a straight ticket he depresses the hand lever in said notch or slot and turns the crank 62 as far as it will go. When the lever is moved over one of the slots 50 the cam 49 of said lever depresses one of the springs 37 so that the dog 36 which it carries will be projected into the path of the units-wheels 24 of the registers of one series, and consequently when the drum is revolved each one of the registers in such series will be actuated so that each of the candidates will receive one vote. Should the voter desire to vote a split ticket he shifts the lever 41 back and forth in the longitudinal slot 49 and depresses it into the proper vertical slots or notches 50 according to the candidate for whom he desires to cast his vote, it being understood that he looks through the sight opening in the top of the casing to ascertain which candidate will receive his vote when the lever is depressed. Each time the lever is depressed the drum is moved to the distance of one tooth of the ratchet wheel 53 and consequently the lever must be repeatedly depressed until the trip lugs 76, 88 respectively engage the lugs 73, 85, to shift the pairs of toggle levers at the ends of the casing from their angular to their straightened position. When these toggle levers are straightened they elevate the arms 46 and consequently lift the rock shaft 45, and as said arms are elevated the toggle lever 63, 64 co-acting with the link 69 will elevate and swing rearwardly the link 68 so that the pins 71, 72 will elevate and retract the dogs 52, 59, from engagement with the ratchet wheel 53. When the lug 88 approaches the lug 85 it elevates the latch spring 86 to release said lug and then engages the latter and straightens the levers 80, 81, and when the lug 76 engages the lug 73 it straightens the toggle levers 63, 64, and brings said lug 73 into the seat 77 of the spring latch 74 so that the latter holds the parts in retracted position. When the dogs or pawls 52, 59 are retracted as above explained, the drum is released and the spring 57 will rotate the drum in the opposite direction until the non-adjustable lugs 75, 87, respectively engage the lugs 73, 85, to return the pairs of toggle levers to their angular position. As the lug 75 approaches the lug 73 it depresses the spring latch 74 to release the lug 73 before it engages it. The lug 88 in approaching the lug 85 engages and actuates the bell operating element 92 so that the bell will be sounded to notify the officer in charge of the machine that it is ready for the next voter. When the toggle levers 80, 81 are returned to their angular position, the dog 96 actuates the register in the end 3 of the casing, as will be understood on reference to Fig. 6. After all of the votes have been cast the proper officer opens the lock 9 in the door or cover 7 of the casing so that when the tickets T are removed from their supporting strips or bands 34 the several registers may be ready to ascertain the number of votes cast for the several candidates.

From the foregoing it will be seen that the invention is simple in construction so that it may be produced at a small cost, will be strong and durable and may be readily operated by persons of ordinary intelligence. The peculiar construction of the several parts and their arrangement within the casing effectively prevents the machine from being tampered with and prevents voters from repeating their votes or otherwise cheating. The peculiar construction also renders the machine entirely automatic in operation so that it needs no attention on the part of the officer in charge of it.

While I have shown and described in detail the preferred embodiment of my invention, I wish it understood that I do not limit myself to the same, and that various changes in the form, proportion and arrangement of parts, and in the details of construction, may be resorted to within the spirit and scope of my invention.

Having thus described the invention what is claimed is:

1. In a voting machine, the combination of a casing, a rotary drum, annular series of registers mounted upon the drum, means for operating said registers in the rotation of the drum, an operating member mounted for sliding and swinging movement, said register operating means being engaged in the sliding movement of said actuating member to dispose the same in position to operate one of the series of registers carried by the drum upon the rotation thereof, means actuated by the swinging movement of said member to intermittently rotate the drum in one direction, and additional means automatically actuated by the swinging movement of said member and at a predetermined point in the rotation of the drum to automatically rotate the drum in the opposite direction.

2. In a voting machine, the combination of a casing, a rotary drum, annular series of registers upon the drum, movable elements normally disposed in an inoperative position adapted to operate the series of registers in the rotation of the drum, an actuating member mounted for sliding and swinging movement, said member being adapted to engage the register operating elements in its sliding movement to move the same to their operative positions for engagement with the register series, means for rotating the drum in one direction, and means automatically actuated in the swinging movement of said member when the drum has been rotated a predetermined distance in one direction to rotate said drum in the opposite direction and reset the same.

3. In a voting machine, the combination of a casing, a rotary drum, annular series of registers upon the drum, a movable dog for each of said series of registers, the said dogs being normally inoperative, an actuating member mounted for sliding and swinging movement, and shiftable into engagement with any one of said dogs, by reason of its sliding movement, and adapted to maintain the dog which it engages in operative position, means actuated by the swinging movement of said member for intermittently rotating the drum, and means for resetting the drum after it has moved a predetermined distance in the same direction.

4. In a voting machine, the combination of a casing, a rotary drum, annular series of registers upon the drum, a movable dog for each of said series of registers, the said dogs being normally inoperative, an actuating member mounted for sliding and swinging movement and adapted to be slid into engagement with any one of said dogs to maintain it in operative position, means actuated by the swinging movement of said member for intermittently rotating the drum in the same direction, a spring for actuating the drum in the opposite direction, means for preventing retrograde rotation under the action of said spring, and a stop mechanism for releasing the last mentioned means after the drum has been rotated a predetermined distance by the said means, which actuates it intermittently.

5. In a voting machine, the combination of a casing, a rotary drum, annular series of registers upon the drum, a movable dog for each of said series of registers, the said dogs being normally inoperative, an actuating member mounted for sliding movement and adapted to be slid into engagement with any one of said dogs, to maintain it in operative position, a handle independent of said actuating member for rotating the drum in one direction, a spring for rotating the drum in the opposite direction, means for preventing the retrograde rotation of the drum under the action of said spring, and a stop mechanism for releasing the last mentioned means after the drum has been rotated a predetermined distance by said handle.

6. In a voting machine, the combination of a casing, a rotary drum, annular series of registers upon the drum, a movable dog for each of said series of registers, the said dogs being normally inoperative, an actuating member mounted for sliding and swinging movement and adapted to be slid into engagement with any one of said dogs, to maintain it in operative position, a ratchet wheel on said drum, a spring for rotating the drum in one direction, a pawl to engage the ratchet and prevent it from rotating under the action of said spring, a second pawl co-acting with said ratchet wheel and actuated by the swinging movement of said member, whereby the drum will be intermittently rotated in the same direction to wind up said spring, a toggle link device for retracting both of said dogs from engagement with the ratchet wheel, a latch co-acting with said toggle link device, and a stop mechanism for the drum to actuate and control said toggle link device and said latch.

7. In a voting machine, the combination of a casing, a rotary drum, annular series of registers upon the drum, a movable pawl for each of said series of registers, the said pawls being normally inoperative, a rock shaft movable toward and from the drum, toggle link connections for shifting said rock shaft, an actuating member slidable on the rock shaft into engagement with any one of said pawls to maintain it in operative position, a ratchet wheel upon the drum, a spring for actuating the drum in one direction, a pawl coacting with the ratchet wheel to prevent rotation of the drum by the spring, a second pawl co-acting with the ratchet wheel and actuated by the rocking movement of said shaft, whereby the drum will be intermittently rotated to wind up the spring, means actuated by one of said toggle link connections for simultaneously retracting both pawls, latches to co-act with said toggle link connections, to maintain the pawls in inoperative position, and a stop mechanism for the drum adapted to actuate and control said toggle link connections and said latches.

8. In a voting machine, the combination of a casing, a rotary drum, annular series of registers upon the drum, a crank handle for rotating the drum, an operating lever mounted for sliding and swinging movement, normally inoperative register actuating dogs adapted to be controlled by the sliding movement of said lever, and means actuated by the swinging movement of said lever for intermittently rotating said drum.

9. In a voting machine, the combination of a casing, a rotary drum, annular series of registers upon the drum, a crank handle for rotating the drum, an operating lever mounted for sliding and swinging movement, normally inoperative register actuating dogs adapted to be controlled by the sliding movement of said lever, means actuated by the swinging movement of said lever for intermittently rotating said drum, and means for automatically resetting the drum.

10. In a voting machine, the combination of a casing, a rotary drum, annular series of registers upon the drum, a crank handle for rotating the drum, an operating lever mounted for sliding and swinging movement, normally inoperative register actuating dogs adapted to be controlled by the sliding movement of said lever, means actuated by the swinging movement of the lever for rotating said drum, a spring for rotating said drum, a pawl for preventing retrograde rotation of the drum under the action of said spring, and a stop device for limiting the rotary movement of the drum by said drum rotating means said stop device also rendering inoperative said pawl and said lever.

11. In a voting machine, the combination of a casing, a rotary drum, annular series of registers upon the drum, a movable pawl for each of said series of registers, the said pawls being normally inoperative, a rock shaft movable toward and from the drum, toggle link connections for shifting said rock shaft, an actuating member slidable on the rock shaft into engagement with any one of said pawls to maintain it in operative position, a ratchet wheel upon the drum, a spring for actuating the drum in one direction, a pawl coacting with the ratchet wheel to prevent rotation of the drum by the spring, a second pawl co-acting with the ratchet wheel, and actuated by the rocking movement of said shaft whereby the drum will be intermittently rotated to wind up the spring, means actuated by one of said toggle link connections for simultaneously retracting both pawls, latches to co-act with said toggle, link connections to maintain the pawls in inoperative position, stationary stop or trip lugs upon the ends of the drum, and other stop or trip lugs adjustable around the ends of the drum, the said lugs co-acting with said toggle link connections and said latches as and for the purpose specified.

12. In a voting machine, the combination of a casing, a rotary drum, annular series of registers on the drum, a plurality of dogs for actuating said registers, said dogs being normally in inoperative position, pivotally mounted arms, a rock shaft mounted in the front ends of said arms, an actuating member slidably but non-rotatably arranged on said rock shaft and having a cam movable into engagement with any one of said dogs to maintain the same in operative position, means for limiting the swinging movement of said actuating member, pairs of toggle links between the casing and said arms, a ratchet wheel at one end of the drum, a spring for actuating the drum in one direction, a pawl co-acting with the ratchet wheel to prevent the rotation of the drum by said spring, an arm on said rock shaft and carrying a second pawl to engage the ratchet wheel whereby the drum may be intermittently rotated to wind up the spring, when said shaft is rocked, means actuated by one of said toggle links for simultaneously retracting said pawls, latches co-acting with said toggle links, and stationary and adjustable stop or trip lugs at one end of the drum to co-act with said toggle links and said latches.

13. In a voting machine, the combination of a casing, a rotary drum, annular series of registers on said drum, normally inoperative actuating dogs for said registers, a longitudinal rock shaft, movable bearings for said shaft, toggle lever connections between the casing and said bearings, means slidable on said shaft for actuating said dogs, means actuated by the oscillatory movement of said shaft for intermittently rotating said drum in one direction, a spring for rotating said drum in the opposite direction, a pawl for preventing retrograde rotation of said drum under the action of said spring, and a stop mechanism for actuating said toggle connections to limit the rotary movement of the drum by said drum actuating means, and to control the resetting of the drum.

14. In a voting machine, the combination of a casing, a rotary drum, annular series of registers on said drum, normally inoperative actuating dogs for said registers, a longitudinal rock shaft, movable bearings for said shaft, toggle lever connections between the casing and said bearings, a hand lever slidably and non-rotatably mounted on said rock shaft and adapted to engage and actuate said dogs, a spring for elevating said lever, a spring for rotating said drum in one direction, a pawl for preventing retrograde rotation of said drum under the action of the last mentioned spring, an arm upon said rock shaft, a pawl upon said arm for intermittently rotating said drum against the tension of its actuating spring, toggle lever connections between said bearings and the casing, means actuated by one of said toggle lever connections for rendering said pawls inoperative, a latch for one of said toggle lever connections for maintaining the rock shaft in elevated position, a latch for the other toggle lever connection for maintaining said rock shaft in lowered position, and trip lugs upon the ends of said drum for actuating said latches and said toggle lever connections.

15. In a voting machine, the combination of a rotatably mounted drum, annular series of registers on the same, ticket supporting bands surrounding said annular series of registers, and covering the major portions of said registers, said bands having slots to expose portions of the registers whereby the latter may be read, tickets removably arranged on said bands and covering said slots to prevent the registers from being read until the tickets are removed from the band, and means for actuating the registers when the drum is rotated.

16. The combination in a voting machine, of a rotatably mounted drum, annular series of registers upon said drum, T-shaped springs provided with pins to co-act with said registers, and a slidable cam to engage and actuate said springs.

17. In a voting machine, the combination of a casing, having a slot and notches communicating therewith, a drum rotatably mounted in the casing, annular series of registers on the drum, a series of dogs co-acting with said registers, a rock shaft in the casing adjacent its slot, a dog actuating member shiftable on said rock shaft, a lever carried by said member and adapted to slide through the slot in the casing, and swing in the notches of the same, and means actuated by the rocking movement of said shaft for rotating said drum.

18. In a voting machine, the combination of a rotatably mounted drum, annular series of registers thereon, a series of normally inoperative dogs to co-act with said series of registers, a cam actuating means for said dogs, shiftable into engagement with any one of them, means for rotating said drum, in one direction, a spring for rotating the drum in the other direction, a pawl to prevent rotation of the drum by said spring, and a stop mechanism for the drum adapted to retract said pawl when the drum is moved a predetermined distance under the action of said rotating means.

19. In a voting machine, the combination of a rotatably mounted drum, having at one of its ends an arcuate series of openings, annular series of registers on said drum, a series of dogs co-acting with said registers, said dogs being normally inoperative, a common actuating means for said dogs, means for rotating said drum in one direction, a spring for rotating the drum in the other direction, a ratchet wheel on the drum, a pawl co-acting with the ratchet wheel to prevent the spring from rotating, means for retracting said pawl, and stationary adjustable trip lugs co-acting with the last mentioned means, the adjustable trip lugs being interchangeably arranged in the openings in the end of the drum.

20. In a voting machine, the combination of a support, a rotary shaft, a drum having two heads fixed to said shaft, and an annular series of longitudinal slats uniting said heads, said slats being formed with transverse grooves and the latter being arranged in annular series on the drum, annular series of registers arranged on said slats and having portions projecting into the grooves in the latter, a longitudinal series of dogs to co-act with said registers and movable into and out of the grooves in said slats, said dogs being normally inoperative, means for depressing any one of said dogs and holding it in operative position, and means for rotating the drum when one of the dogs is depressed.

21. The combination in a voting machine, of a casing, a rotatably mounted drum carrying registers, means for actuating said drum, a pawl and ratchet mechanism at one end of the drum for intermittently rotating it and preventing retrograde rotation, register operating means, toggle lever devices adjacent the opposite ends of the drums for controlling said mechanism and said register operating means, latches to co-act with said toggle lever devices, and trip members carried by the drum for actuating said latches and said toggle lever devices.

22. The combination in a voting machine, of a casing, a rotatably mounted drum carrying registers, means for actuating said drum, a pawl and ratchet mechanism at one end of the drum for intermittently rotating it and preventing retrograde rotation, register operating means, toggle lever devices adjacent the opposite ends of the drums for controlling said mechanism and said register operating means, latches to co-act with said toggle lever devices, trip lugs upon the ends of the drum to co-act with said latches and said toggle lever devices, and other adjustable trip lugs upon the ends of the drum to co-act with said toggle lever devices.

In testimony whereof I hereunto affix my signature in the presence of two witnesses.

GUNDER G. FELLAND.

Witnesses:
H. JURGENSEN,
CHRIS JENSEN.